Figure 1:
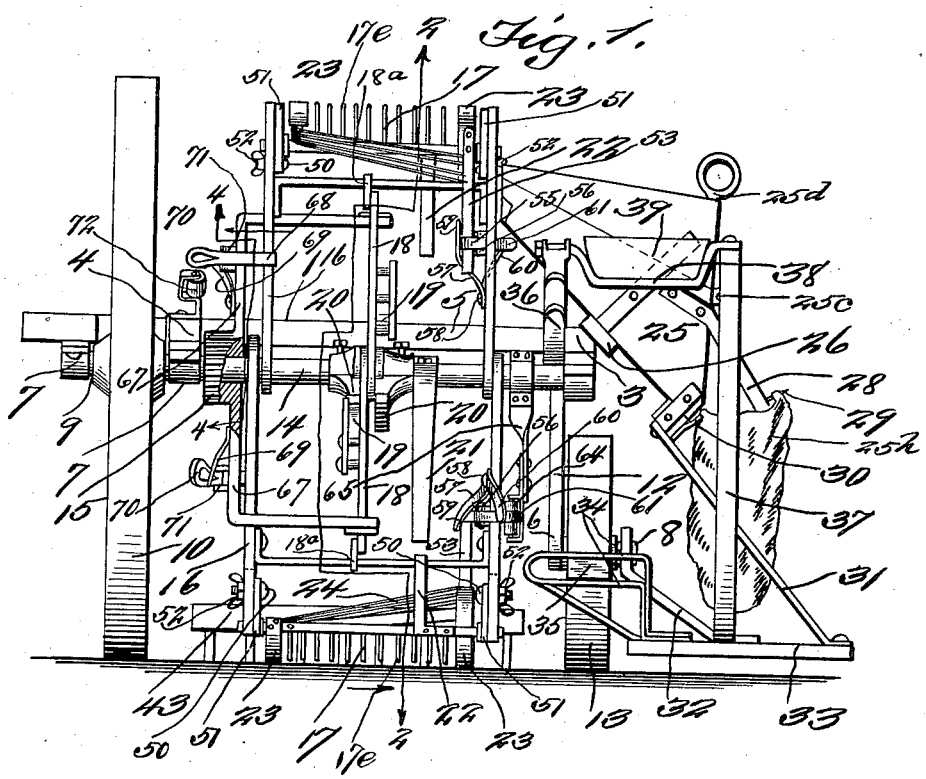

A. GILMORE.
POTATO PICKER.
APPLICATION FILED JULY 8, 1911.

1,028,205.

Patented June 4, 1912.
3 SHEETS—SHEET 1.

Witnesses
Francis G. Boswell
R. Cot

Inventor
Allen Gilmore,
By D. Swift &C.
Attorney

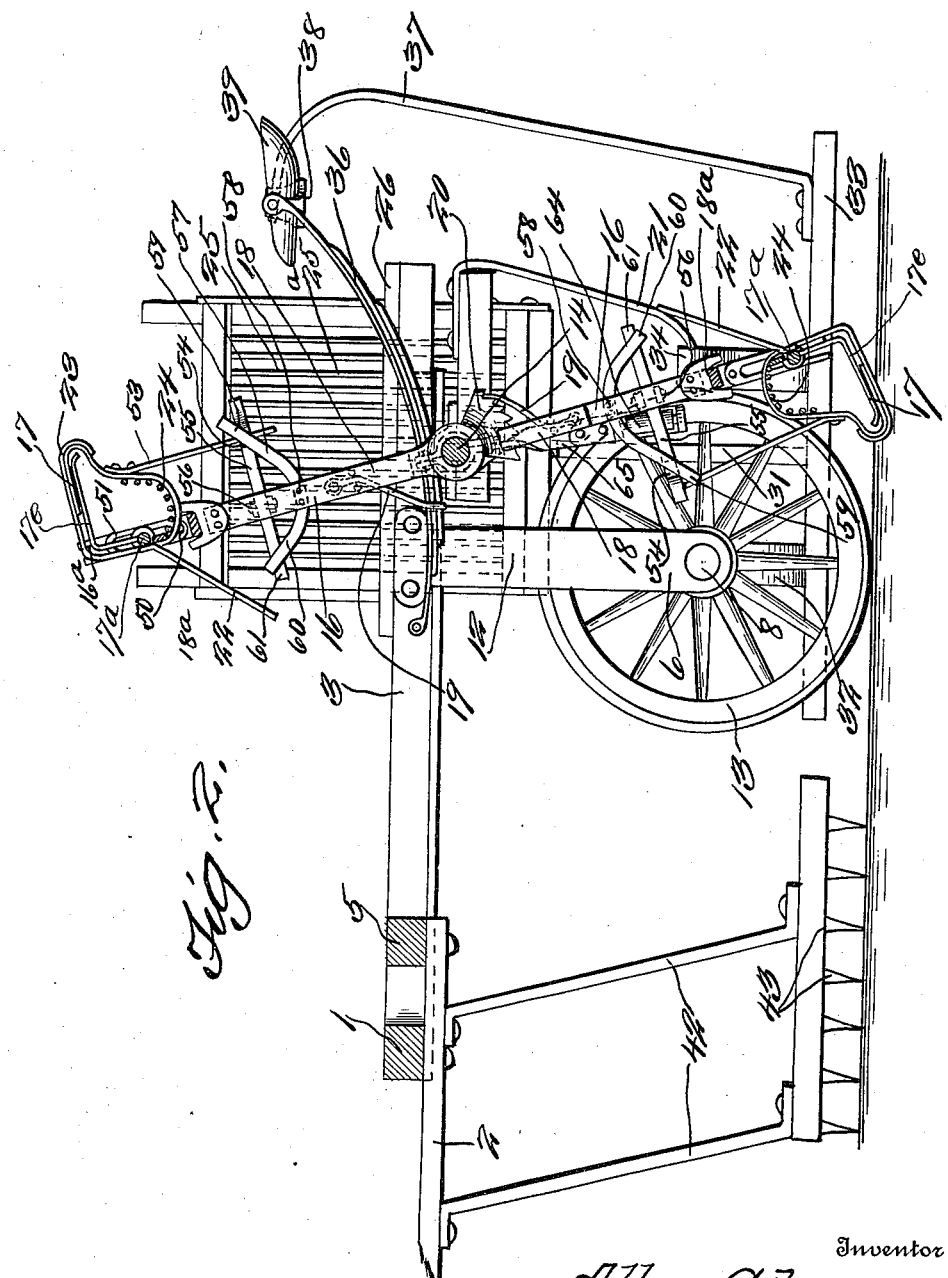

A. GILMORE.
POTATO PICKER.
APPLICATION FILED JULY 8, 1911.
1,028,205.
Patented June 4, 1912.
3 SHEETS—SHEET 3.
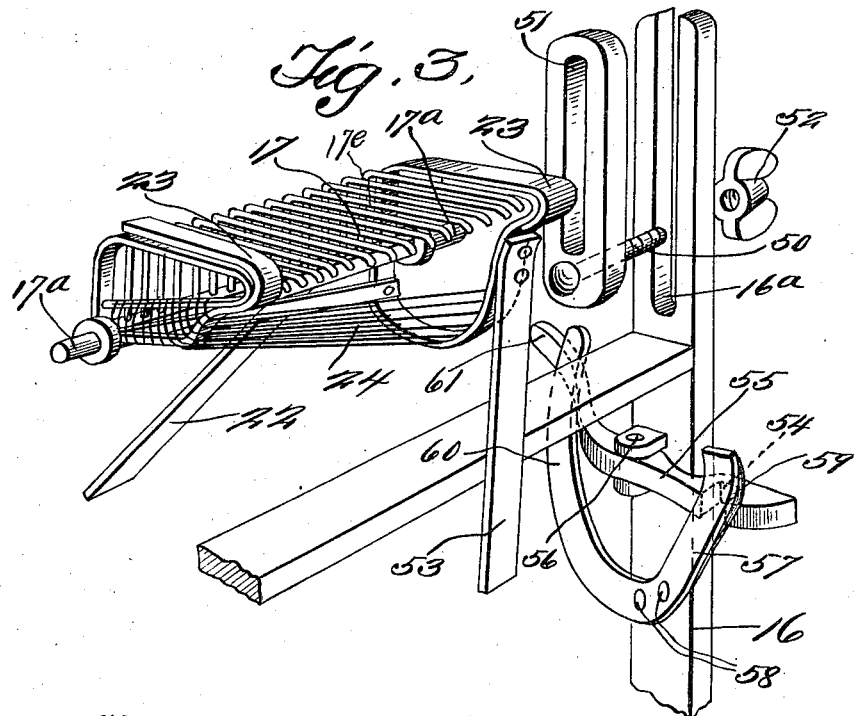
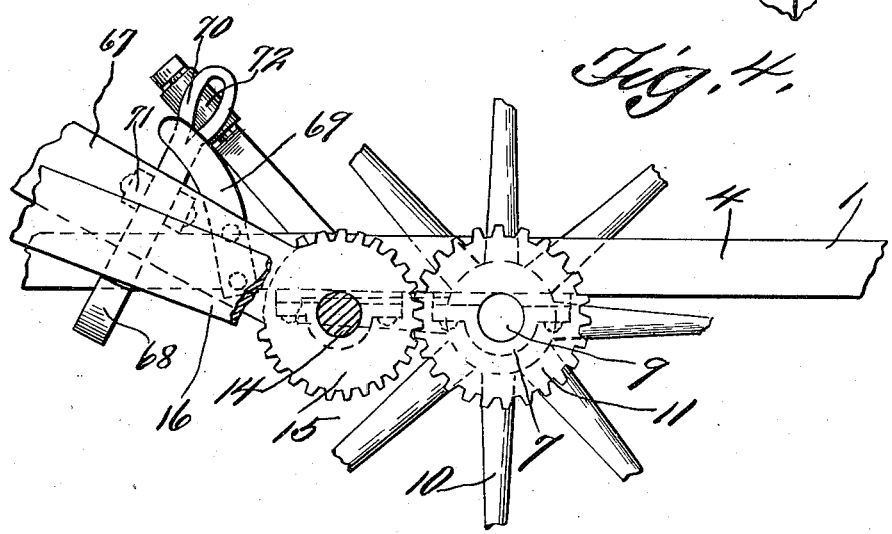
Witnesses
Francis T. O Boswell
R. Cot
Inventor
Allen Gilmore,
By D. Swift &C.
Attorney

UNITED STATES PATENT OFFICE.

ALLEN GILMORE, OF LYNDON, WISCONSIN.

POTATO-PICKER.

1,028,205. Specification of Letters Patent. Patented June 4, 1912.

Application filed July 8, 1911. Serial No. 637,573.

*To all whom it may concern:*

Be it known that I, ALLEN GILMORE, a citizen of the United States, residing at Lyndon, in the county of Juneau and State of Wisconsin, have invented a new and useful Potato-Picker; and I do hereby declare the following to be a full, clear, and exact description of the invention, such as will enable others skilled in the art to which it appertains to make and use the same.

This invention relates to a new and useful harvester or digger, for excavating potatoes and the like from the soil.

The invention in its broadest scope aims as its primary object, to provide a pair of oppositely arranged revoluble potato diggers or rakes, which when moving in their line of travel, excavate the potatoes from the soil, and then elevate them, and deposit them in a chute, from which they fall into a suitable bag or other receptacle, suspended from the lower lateral end of the chute.

A further object of the invention is to provide the rakes or diggers with basket like members, which act as covers for the rakes or diggers when they are removing the potatoes from the soil, and as baskets to catch the potatoes, when the rakes or diggers reach positions substantially above the driving shaft or axle of the diggers or rakes. As each rake or digger reaches the position substantially above the said shaft, the potatoes pass from the basket into the chute.

A further object of the invention is the provision of means for preventing retrogression of the diggers or rakes, as they partially enter the soil. The rakes or digger members are slidingly carried by U-shaped frames, which are carried by a shaft.

A further object of the invention is to provide means on a shaft for moving the U-shaped frames of the rakes or diggers, the means including latches for engaging the frames for supporting the same, which latches are designed to be automatically disengaged from the frames, when the rakes or digger members are substantially in a horizontal plane with the shaft of the U-shaped frames.

A further object of the invention is to provide abutment members to be contacted with by arms of the rakes or diggers for directing the same into the soil.

The drawings disclose only one form of the invention, but in practical fields this form may necessitate alterations, to which the applicant is entitled, provided the alterations are comprehended within the scope of what is claimed.

The invention comprises further features and combination of parts, as hereinafter set forth, shown in the drawings and claimed.

Figure 5:
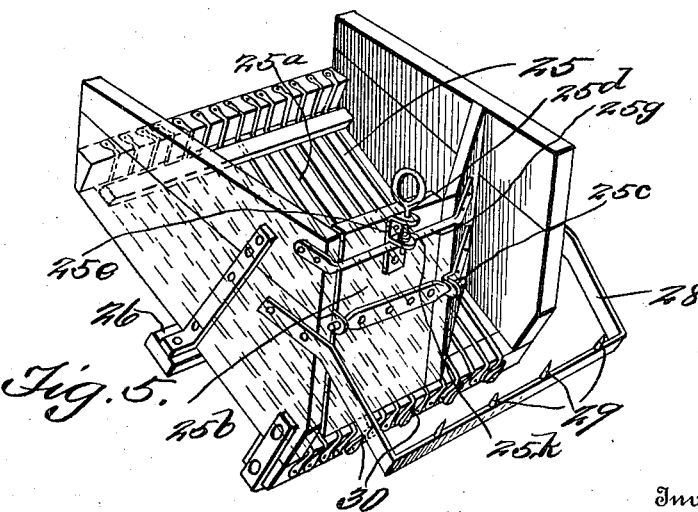

In the drawings:—Figure 1 is a rear elevation of a potato harvester or digger constructed in accordance with the invention. Fig. 2 is a sectional view on line 2—2 of Fig. 1. Fig. 3 is a view in perspective of one of the rakes or diggers, showing the means for supporting the same in the U-shaped frames, and further showing the latch for releasing and receiving a member of the digger at different times, as the U-shaped frames revolve. Fig. 4 is a sectional view on line 4—4 of Fig. 1. Fig. 5 is a detail perspective view of the chute or hopper.

Referring more especially to the drawings 1 designates a frame, comprising forward transverse beams 5 (from which the tongue projects) having side frames 3 and 4. The side frames are secured to and project rearwardly from transverse beams 5. Mounted in suitable bearings 6 and 7 of the side frames are the stub shafts or axles 8 and 9. Mounted upon the stub shaft or axle 9, so as to rotate therewith is a drive wheel 10 and a spur gear 11. The bearings 6 are carried by downwardly projecting bracket arms 12 of the U-shaped frame 3, and mounted upon the stub shaft or axle 8, is a truck wheel 13, designed for supporting one side of the frame.

Mounted in suitable bearings on the side frames is a shaft 14, on one end of which a gear 15 is mounted so as to mesh with the spur gear 11, whereby motion may be imparted to the shaft 14. Journaled on the shaft 14 are two U-shaped frames 16, in the free portions of which slots $16^a$ are formed, through which the screws 50 extend. These screws 50 also extend through the elongated slotted plates 51, so as to hold the plates 51 adjacent the slotted or bifurcated ends of the frames 16. Rakes or digger members 17 are provided, which consist of transversely arranged forks $17^e$, which are angular. These forks form one side of the digger members, while the inclined rods of the baskets form the other side of the digger members. The spindles $17^a$ of the digger members extend through the slots of the plates 51 and the bifurcations of the frames 16, so as to have a slight play therein. As the rakes or digger members approach the soil, the spindles 17ª move to the outer ends of the slots of the plates 51. Wing nuts 52 are threaded on the screws 50, for clamping the plates 51 in adjusted positions and close against the free ends of the frames 16. The rakes or digger members 17 are provided with arms 53, which are designed to be received by the notches 54 of the latches 55 which are pivoted as at 56 to the sides of the U-shaped frames 16, that is, as the rakes or digger members 17 are leaving the soil after having extracted the potatoes therefrom. Springs 57 secured at 58 to the sides of the frames 16 are provided, the free ends 59 of which cover the notches 54, thus constituting means for holding the arms 53 in the notches. The springs 57 terminate in the springs 60, which engage the free ends 61 of the latches 55, thus holding the notched ends of the latches and the free ends of the springs 57 adjacent one another. When the rakes or digger members are approaching the soil, the arms 53 are withdrawn from the notches 54 of the latch members 55, by reason of the fact that the spindle 17ª moves outwardly in the slots of the plates 51 and the bifurcations 16ª of the frames 16. After the rakes or digger members have engaged the soil, however, the spindles 17ª are moved back in the slots of the plates 51, and at the same time the ends 61 of the latch members 55 contact with the rollers 64 of the arm 65, thus forcing the notched end of the latch 55 away from the free end of the spring 57, thus permitting the spring arm 53 to again enter the notch. Also journaled on the shaft 14 are the members or sweeps 18 having connections 18ª with the U-shaped frames 16. The members or sweeps 18 are provided with spring tensioned latch members 19, designed to coöperate with the segmental ratchets 20 of the shaft 14, when the rakes or digger members are about to enter the soil, so as to prevent retrogression of the rakes or digger members. An abutment member 21 is provided with which arms of the digger members or rakes contact. These arms 22 and the abutment member 21 constitute means for throwing the rakes or digger members in their proper angles and directing them into the soil. The rakes or digger members are provided with runners 23 for sliding on the soil, as the rakes or digger members are excavating the potatoes from the soil. The rakes or digger members are provided with inclined baskets 24, which catch the potatoes, when the rakes or digger members reach inverted positions substantially above the axle or shaft 14, and from which baskets the potatoes pass into the chute 25 (which is supported by a supplemental frame 26 of the U-shaped frame 3, and above the truck wheel 13.)

When one or the other of the rakes or digger members reaches a position substantially above the shaft 14, the spindles 17ª of the rakes or digger members move in the slots of the plates 51 in the direction of the shaft 14. This action is performed somewhat quickly, so as to jolt the potatoes slightly whereby the potatoes may empty into the chute.

The lower side end of the chute is provided with a bail shaped member 28 having spurs 29. The lower side of the chute is also provided with hooks 30, between which and the spurs 29, a bag or sack 25ʰ is suspended, for receiving the potatoes from the chute. Supported from the frame of the machine and the lower side end of the chute by means of the bars 31 and 32, is a platform 33. This platform 33 is designed for the purpose of permitting an operator to stand thereon, so as to change the bags or sacks, as the machine is in operation. Projecting from the platform is an angular arm 34 having a brake shoe 35 to coöperate with the truck wheel 13. Suspended between a spring arm 36 of the main frame and a spring arm 37 of the platform, by means of a transverse rod 38 is a seat 39, in which an operator may sit so as to guide the draft horses (not shown).

Extending radially from the gear 15, and in opposite directions are the arms 67, which are arranged adjacent one side of the U-shaped frames 16, and are provided with latch members 68 to engage the frames 16, so as to hold the frames and the arms 67 together. Springs 69 bear against the ends 70 of the latch 68 so as to hold the latch members in engagement with the sides of the frames, which latch members are pivoted at 71. When the arms 67 reach substantially horizontal positions the ends 70 of the latch members contact with the rollers 72, so as to disengage the latches from the sides of the frames 16, which will permit the frames 16 to move away from the arms 67, thus throwing the rakes or digger members in position to perform their duty.

The chute 25 is provided with an openwork or mesh bottom 25ª, through which the dirt and similar matter may sieve, thus leaving the potatoes in the chute. A gate 25ᵇ is pivoted at 25ᶜ, and is provided with at latch bolt 25ᵈ, mounted in a bracket 25ᵉ. A rod 25ᵍ extends across the opening which the gate closes, as shown in Fig. 5. This rod 25ᵍ is arranged between the bracket 25ᵉ and the lower end of the latch bolt. By raising the latch bolt against the action of the spring 25ᵏ, the gate 25ᵇ may be oscillated, whereby the potatoes may be emptied into the sack 25ʰ.

As the machine is driven forward, the potatoes are excavated, and elevated by the rakes or digger members, and subsequently delivered into the chute, and thence into the sack or bag. The baskets 24 act as covers for the rakes or digger members as they enter the soil, so as to prevent the overflow of potatoes from falling back in the soil.

From the foregoing it will be observed that there has been produced a simple, novel and efficient potato harvester, and one which has been found to be exceedingly practicable in farming.

Suspended from the tongue forwardly of the rakes or diggers, by means of the rods 42 is a drag rake 43, designed for the purpose of bunching or gathering potatoes to the center of the machine.

The invention having been set forth, what is claimed as new and useful is:—

1. In a harvester, a frame having a driving mechanism, a shaft mounted in bearings of the frame having gear connections with the driving mechanism, said shaft having revoluble rakes and means for preventing retrogression of the rakes as they enter the soil, and means for directing the rakes into the soil, a chute having a bag attached thereto supported from the frame for receiving the potatoes when elevated by the rake, the rakes having one of their sides inclined so that the potatoes may roll into the chute.

2. In a harvester, a frame having a driving mechanism, a shaft mounted in bearings of the frame having gear connections with the driving mechanism, the shaft having frames provided in their free ends with slidingly mounted rakes, the shaft having sweeps to coöperate with the frames for moving them, and means coöperating between the shaft and the axle for preventing retrogression of the rakes as they enter the soil, means for directing the rakes into the soil, a chute having a bag attached thereto for receiving the potatoes when elevated by the rakes, each rake having one of its sides inclined, so that the potatoes may pass into the chute when each rake reaches a position substantially above the shaft.

3. In a harvester, a pair of revoluble frames, slotted members carried by the outer ends of the frames, digging members arranged movably in the outer portions of the frames and in the slotted members, and means for holding the digging members in different positions as the frames revolve.

4. In a harvester, a pair of revoluble frames, slotted members carried by the outer ends of the frames, digging members arranged movably in the outer portions of the frames and in the slotted members, and means for holding the digging members in different positions as the frames revolve, and mechanisms coöperating with the means for releasing the digging members.

5. In a harvester, a pair of revoluble frames, slotted members carried by the outer ends of the frames, digging members arranged movably in the outer portions of the frames and in the slotted members, and means for holding the digging members in different positions as the frames revolve, and means for adjusting the digging members radially in the frames.

6. In a harvester, a pair of revoluble frames, slotted members carried by the outer ends of the frames, digging members arranged movably in the outer portions of the frames and in the slotted members, and means for holding the digging members in different positions as the frames revolve, and means for adjusting the digging members radially in the frames, and a roller disposed in the path of the first means for actuating the same whereby the digging member may be released.

7. In a harvester, a shaft, a pair of frames loosely connected thereto, a gear on the shaft having bracket arms, means carried by the arms for locking the frames to the arms for moving the frames, a device in the path of the means for actuating the same for releasing the frames when they approach substantially horizontal positions as they are nearing the soil, and means for operating the gear.

8. In a potato digger, a pair of revoluble frames, gravity movable digging members mounted in the outer ends of the frames, the digging members having transversely arranged resilient forks disposed in parallel relation with one another, the forks forming one side of each of the digging members, the digging members having inclined rods forming the other side of the digging members.

9. In a potato digger, revoluble frames, gravity movable digging members mounted in the outer ends of the frames, the digging members having arms, the frames having means to receive the arms for holding the digging members in one position, and a device in the path of said means for actuating the same for releasing the arms.

10. In a potato digger, revoluble frames, gravity movable digging members mounted in the outer ends of the frames, the digging members having arms, the frames having means to receive the arms for holding the digging members in one position, and a device in the path of said means for actuating the same for releasing the arms, and means for bracing the frames as the digging members enter the soil.

11. In a potato digger, a main frame, a shaft mounted in bearings thereof, revoluble frames on the shaft, slotted members carried by the outer ends of the revoluble frames, gravity actuated digging members mounted in the outer ends of the revoluble frames and in the slotted members, and means for adjusting the slotted members radially of the revoluble frames.

12. In a potato digger, a main frame, a shaft mounted in bearings thereof, revoluble frames on the shaft, slotted members carried by the outer ends of the revoluble frames, gravity actuated digging members mounted in the outer ends of the revoluble frames and in the slotted members, and means for adjusting the slotted members radially of the revoluble frames, the digging members having arms, the revoluble frames having means to receive the arms for holding the digging members in one position, and a device in the path of the means for actuating the same to release the arms, thereby allowing the positions of the digging members to be changed.

13. In a potato digger, a main frame, a shaft mounted in bearings thereof, revoluble frames on the shaft, slotted members carried by the outer ends of the revoluble frames, gravity actuated digging members mounted in the outer ends of the revoluble frames and in the slotted members, and means for adjusting the slotted members radially of the revoluble frames, the digging members having arms, the revoluble frames having means to receive the arms for holding the digging members in one position and a device in the path of the means for actuating the same to release the arms, thereby allowing the positions of the digging members to change, the revoluble frames having arms, and means on the shaft to be engaged by the arms for bracing the frames as the digging members enter the soil.

In testimony whereof I have signed my name to this specification in the presence of two subscribing witnesses.

ALLEN GILMORE.

Witnesses:
OLIVER P. HELLAND,
E. H. ROTHE.

Copies of this patent may be obtained for five cents each, by addressing the "Commissioner of Patents, Washington, D. C."